United States Patent
Gullicksen (10) Patent No.: US 12,481,351 B2
(45) Date of Patent: *Nov. 25, 2025

(54) MAINTAINING LOCALIZATION AND ORIENTATION OF ELECTRONIC HEADSET AFTER LOSS OF SLAM TRACKING

(71) Applicant: Reavire, Inc., Elk Grove, CA (US)

(72) Inventor: Jeff Gullicksen, Mountain View, CA (US)

(73) Assignee: Reavire, Inc., Elk Grove, CA (US)

(*) Notice: Subject to any disclaimer, the term of this patent is extended or adjusted under 35 U.S.C. 154(b) by 104 days.

This patent is subject to a terminal disclaimer.

(21) Appl. No.: 17/992,061

(22) Filed: Nov. 22, 2022

(65) Prior Publication Data

US 2023/0091749 A1    Mar. 23, 2023

Related U.S. Application Data (63) Continuation of application No. 16/977,364, filed as application No. PCT/US2018/020888 on Mar. 5, 2018, now Pat. No. 11,513,589.

(51) Int. Cl.
  *G06F 3/01* (2006.01)
  *G01C 21/16* (2006.01)
  (Continued)

(52) U.S. Cl.
  CPC ......... *G06F 3/012* (2013.01); *G01C 21/1656* (2020.08); *G06T 7/73* (2017.01); *H04N 23/90* (2023.01)

(58) Field of Classification Search
  None
  See application file for complete search history.

(56) References Cited

U.S. PATENT DOCUMENTS 8,933,931 B2    1/2015   Balan et al.
10,444,320 B2   10/2019  Gullicksen
(Continued)

FOREIGN PATENT DOCUMENTS

CA    2825681 C  *  7/2017  ......... G06K 9/00577

OTHER PUBLICATIONS

Williams et al., "Automatic Relocalization and Loop Closing for Real-Time Monocular SLAM", Sep. 2011, IEEE Transactions on Pattern Analysis and Machine Intelligence, vol. 33, p. 1699-1711 (Year: 2011).

*Primary Examiner* — Benjamin C Lee
*Assistant Examiner* — Nathan P Brittingham
(74) *Attorney, Agent, or Firm* — BainwoodHuang (57) ABSTRACT

A method, apparatus, and computer program product maintains the ability of an electronic headset to localize and orient itself in space upon a loss of tracking by a SLAM (simultaneous localization and mapping) system by switching to an auxiliary tracking mode upon detection of a loss of accurate tracking by the SLAM system. In one example, the auxiliary tracking mode is based upon detection of a "fingerprint" on a flat surface imaged by one or more cameras in the headset. The fingerprint is defined by a pattern of photographically-identifiable features on the flat surface, such as a pattern of colors and/or textures. In another example, the auxiliary tracking mode is based upon a location of the headset as obtained from an external LPS (local positioning service) and an orientation of the headset as measured by an IMU (inertial measurement unit) provided in the headset.

18 Claims, 4 Drawing Sheets

(51) Int. Cl.
  *G06T 7/73* (2017.01)
  *H04N 23/90* (2023.01)

(56) References Cited

U.S. PATENT DOCUMENTS

| | | | |
|---|---|---|---|
| 10,503,351 B2 | 12/2019 | Gullicksen | |
| 2010/0274434 A1* | 10/2010 | Donnelli | G01S 19/49 |
| | | | 701/31.4 |
| 2014/0022281 A1* | 1/2014 | Georgeson | G06F 3/1454 |
| | | | 345/633 |
| 2016/0345137 A1* | 11/2016 | Ruiz | H04W 4/024 |
| 2017/0352192 A1 | 12/2017 | Petrovskaya et al. | |
| 2018/0005393 A1 | 1/2018 | Senthamil | |
| 2019/0007135 A1* | 1/2019 | Stout | G06T 7/90 |
| 2019/0147609 A1* | 5/2019 | Lohry | G06V 20/64 |
| | | | 382/154 |

* cited by examiner

```
510 ─ Operate the electronic headset in a first
       mode in which the electronic headset
       employs a SLAM (simultaneous
       localization and mapping) system to
       localize and orient itself in a physical
       space 520 ─ In response to detecting a loss of accurate
       tracking by the SLAM system, transition
       operation of the electronic headset to a
       second mode in which the electronic
       headset localizes and orients itself in the
       physical space based upon detection and
       tracking of a fingerprint on a surface in the
       physical space, the fingerprint defined by
       a pattern of photographically-identifiable
       features on the surface
```

FIG. 5

```
610 ─ Operate the electronic headset in a SLAM
       mode in which the electronic headset
       employs a SLAM system to localize and
       orient itself in a physical space 620 ─ In response to detecting a loss of accurate
       tracking by the SLAM system,
       transitioning operation of the electronic
       headset to an LPS/IMU mode in which the
       electronic headset localizes and orients
       itself in the physical space based upon
       input from the LPS and the IMU
```

FIG. 6

MAINTAINING LOCALIZATION AND ORIENTATION OF ELECTRONIC HEADSET AFTER LOSS OF SLAM TRACKING

BACKGROUND

SLAM (simultaneous localization and mapping) systems find numerous applications in virtual reality (VR), augmented reality (AR), and mixed reality (MR) systems, where electronic headsets present three-dimensional synthetic content to users. For example, an AR headset may run a SLAM system to localize and orient itself in space, such that the AR headset can place holograms (synthetic content) in proper apparent locations and in proper orientations relative to a user's visual perspective. For instance, an AR game may place a hologram of a game character on a table in front of a user. As the user moves, one or more cameras in the headset acquire new images of the space. The SLAM system updates the location and orientation of the headset based on changes in the new images. Once the SLAM system has computed a new location and orientation of the headset, the headset can resize, relocate, reorient, and skew the perspective of the character to maintain the character's apparent position on the table from the user's perspective. The overall effect is to give the subjective impression that the synthetic character is a three-dimensional object in the user's natural environment.

SLAM systems generally work by photographically scanning a space and identifying geometry among walls, ceilings, floors, and physical objects. For example, a SLAM system may employ edge detection to identify edges formed among physical three-dimensional objects and features in a room. The SLAM system may then use changes in detected edges to infer a location and orientation of the headset.

SUMMARY

Unfortunately, SLAM systems can lose tracking if they fail to detect geometrical information about objects. For example, if a user wearing a headset moves toward a wall, the wall may eventually occupy the entire field of view of the cameras, causing the SLAM system to lose tracking, as no edges can be detected. Loss of tracking can be a frustrating experience to users, particularly in the context of gaming, where a loss of tracking can momentarily take a user out of action, and perhaps even make the user vulnerable to other players. Users can avoid loss of SLAM tracking by staying clear of walls and other large surfaces, but this constraint can negatively impact user experience, particularly in small spaces. In addition, avoidance of walls and other flat surfaces may prevent games and other applications from using these areas in productive or creative ways, thus limiting the potential of these games and/or applications.

In contrast with conventional SLAM systems, which can lose tracking when a headset gets close to a wall or other large surface, an improved technique maintains the ability of an electronic headset to localize and orient itself in space, even upon a loss of SLAM tracking, by switching to an auxiliary tracking mode upon detection of a loss of accurate tracking by a SLAM system. In one example, the auxiliary tracking mode is based upon detection and tracking of a "fingerprint" on a flat surface imaged by one or more cameras in the headset. The fingerprint is defined by a pattern of photographically-identifiable features on the surface, such as a pattern of colors and/or textures, to which conventional SLAM systems are normally insensitive. Once the electronic headset has identified a fingerprint, the headset tracks the fingerprint in later-acquired images, updating its own location and orientation based on changes in the fingerprint from different perspectives. In another example, the auxiliary tracking mode tracks location of the headset using an external LPS (local positioning service), which identifies headset location from a global perspective separate from the headset itself. This auxiliary tracking mode also tracks orientation of the headset based upon output from an IMU (inertial measurement unit) provided in the headset.

Advantageously, the improved technique maintains tracking of headset location and orientation where conventional SLAM systems fail, enabling headsets to operate over a larger range of locations. Users can enjoy more consistent performance and can avoid having their activities disrupted by loss of SLAM tracking. Also, users can operate their headsets close to walls and other flat surfaces, which would normally be out-of-bounds in conventional systems.

Certain embodiments are directed to a method of localizing and orienting an electronic headset that renders three-dimensional, holographic images to a user. The method includes operating the electronic headset in a first mode in which the electronic headset employs a SLAM (simultaneous localization and mapping) system to localize and orient itself in a physical space. In response to detecting a loss of accurate tracking by the SLAM system, the method further includes transitioning operation of the electronic headset to a second mode in which the headset localizes and orients itself in the physical space based upon detection and tracking of a fingerprint on a surface in the physical space. The fingerprint is defined by a pattern of photographically-identifiable features on the surface.

Other embodiments are directed to an electronic headset constructed and arranged to perform a method of localizing and orienting itself, such as the method described above. Still other embodiments are directed to a computer program product. The computer program product stores instructions which, when executed on control circuitry of an electronic headset, cause the electronic headset to perform a method of localizing and orienting itself, such as the method described above.

According to some examples, the fingerprint is detected as a pattern of color and/or texture that extends over at least a portion of the surface away from any edges that the surface forms with other surfaces or objects.

According to some examples, the electronic headset operates under control of a software application that directs the electronic headset to render holographic images for least one of virtual reality and augmented reality, and the method further includes rendering the holographic images while the electronic headset operates in the first mode, and continuing to render the holographic images after the electronic headset transitions to the second mode.

According to some examples, when transitioning from the first mode to the second mode, the method further includes establishing a baseline location and orientation of the electronic headset for the second mode based on a last-known location and orientation of the electronic headset determined when operating in the first mode prior to detecting the loss of accurate tracking.

According to some examples, while the electronic headset operates in the first mode and prior to detecting the loss of accurate tracking, the method further includes (i) detecting that the electronic headset is approaching the surface and (ii) in response to detecting that the electronic headset is approaching the surface, preparing to transition from the first mode to the second mode by identifying the fingerprint on the surface.

According to some examples, the method further includes detecting the loss of accurate tracking by the SLAM system by (i) receiving, from the SLAM system, a confidence level that indicates a degree of certainty that the SLAM system is operating accurately and (ii) establishing the loss of accurate tracking in response to the confidence level falling below a predetermined threshold.

According to some examples, the method further includes, in response to the confidence level rising from a value below the predetermined threshold to a value above the predetermined threshold, transitioning from the second mode to the first mode, thereafter suspending detection of fingerprints.

According to some examples, the electronic headset includes a set of cameras configured to generate a succession of video frames, and the method further includes making a selection between the first mode and the second mode each time the set of cameras generates a new video frame.

According to some examples, the electronic headset is disposed in operative communication with an external LPS (local positioning service) configured to measure real-time locations of the electronic headset in physical space. The electronic headset includes an IMU (inertial measurement unit) constructed and arranged to measure real-time orientation of the electronic headset. The method further includes, in response to detecting a loss of accurate tracking based on fingerprint detection while operating in the second mode, transitioning operation of the electronic headset to a third mode in which the headset localizes and orients itself in the physical space based upon input from the LPS and the IMU.

According to some examples, the method further includes transitioning operation of the electronic headset from the third mode to the second mode in response to restored detection of the fingerprint on the surface in the physical space.

According to some examples, the method further includes transitioning operation of the electronic headset from the third mode to the first mode in response to detecting a restoration of accurate tracking by the SLAM system.

Still other embodiments are directed to a method, apparatus, and/or computer program product for localizing and orienting an electronic headset that renders synthetic, holographic images to a user. The electronic headset includes (i) a SLAM (simultaneous localization and mapping) system and (ii) an IMU (inertial measurement unit). The IMU is configured to measure real-time orientation of the electronic headset. The headset is disposed in operative communication with an external LPS (local positioning service) configured to measure real-time locations of the electronic headset in a physical space. The method includes operating the electronic headset in a SLAM mode in which the electronic headset employs the SLAM system to localize and orient itself in the physical space. In response to detecting a loss of accurate tracking by the SLAM system, the method further includes transitioning operation of the electronic headset to an LPS/IMU mode in which the headset localizes and orients itself in the physical space based upon input from the LPS and the IMU.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for an electronic headset maintains the ability of the electronic headset to localize and orient itself in space upon a loss of tracking by a SLAM (simultaneous localization and mapping) system. Headsets employing the improved technique are thus able to function in areas that would be out-of-bounds for conventional SLAM systems, improving functionality and user experience.

Figure 1:
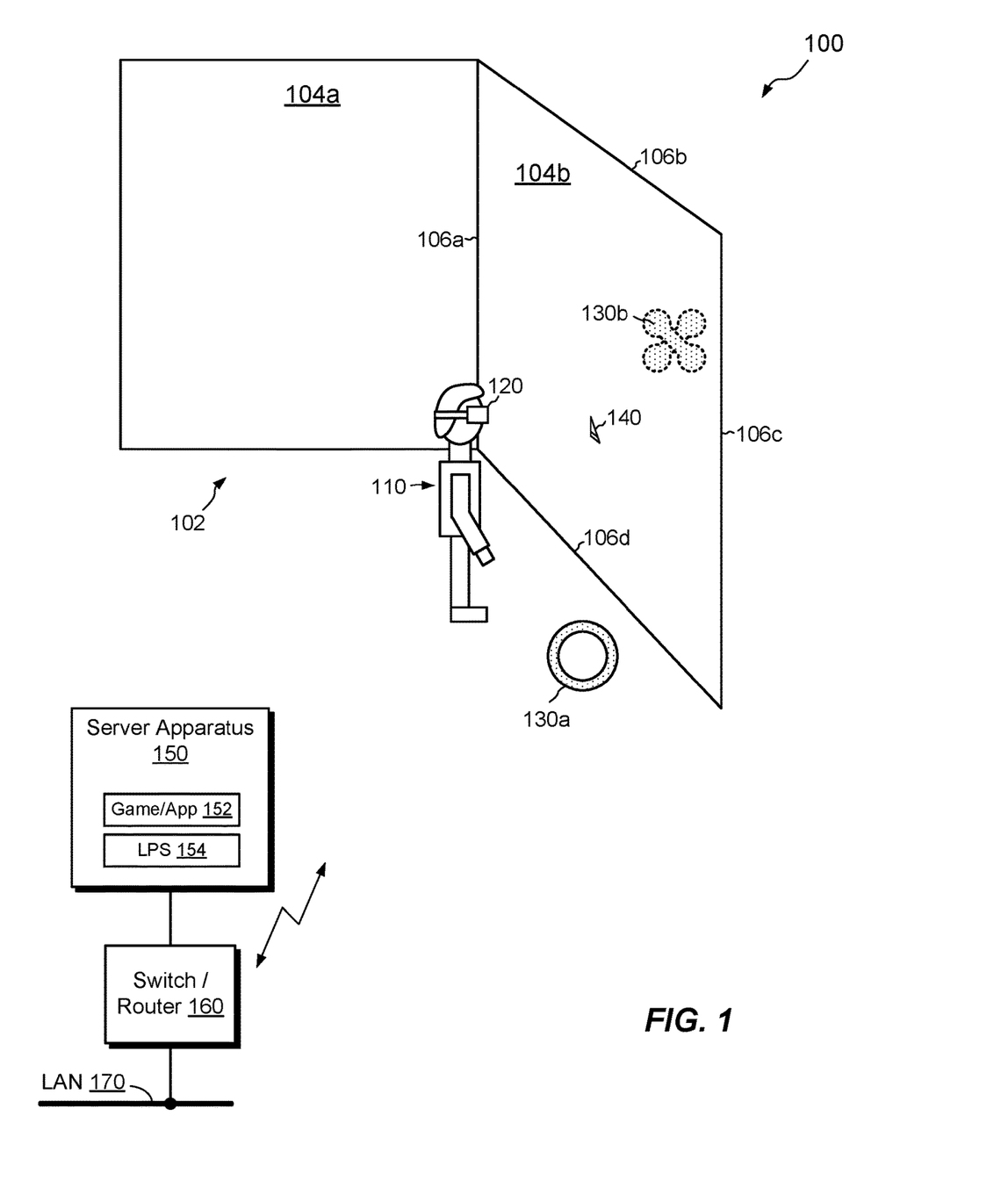
FIG. 1 is a perspective view of an example environment in which embodiments of the improved technique hereof can be practiced.

FIG. 1 shows an example environment 100 in which embodiments of the improved technique hereof can be practiced. Here, a user 110 wears an electronic headset 120 and moves around within a physical space 102, such as a room, other indoor space, or outdoor space. As depicted, the physical space 102 has walls 104a and 104b and may include furniture and/or other objects (not shown).

The electronic headset 120 is configured to render three-dimensional, holographic images to the user 110, such as holograms 130a and 130b. In an example, the electronic headset 120 is implemented as a VR (virtual reality), AR (augmented reality) or MR (mixed reality) headset, such as the Oculus Rift, Microsoft HoloLens, Google Glass, or some other system. As will be described, the electronic headset 120 includes one or more cameras, an IMU (inertial measurement unit), and a SLAM system. As will further be described, the electronic headset 120 includes a SSAL (simultaneous stabilization and localization) system and/or an LPS/IMU system, which may each be used as a fallback system in the event that the SLAM system loses accurate tracking.

As shown, the wall 104b has a flat pattern 140 of photographically-identifiable features. For example, the pattern 140 is one of color and/or texture that extends over at least a portion of the wall 104b away from any edges (e.g., edges 106*a*-106*d*) that the wall 104*b* forms with other surfaces or objects. As will be described, the pattern 140 forms a fingerprint that the SSAL system in the electronic headset 120 may use to track is own location and orientation when the SLAM system is no longer accurately tracking. Although the pattern 140 is shown as having a particular shape (a triangle), this is merely an example, as the pattern 140 may be any pattern which can be identified by the camera(s) and which is not likely to be confused with other patterns visible in the physical space 102. For example, the pattern 140 may be an arrangement of dots, color variations, splotches, marks, stains, or the like. There is no need for the pattern 140 to have any particular or predetermined features. That said, nothing prevents the pattern 140 from having predetermined features. For example, the pattern 140 may be deliberately formed by applying a decal, sticker, or series of marks.

In the example shown, the electronic headset 120 is disposed in operative communication with a server apparatus 150, e.g., using one or more cables and/or using wireless technology, such as Wi-Fi (IEEE 802.11). The server apparatus 150 may have installed thereon a game or other application 152 and may include an LPS (local positioning service) 154. The server apparatus 150 is coupled to a switch/router 160, which enables wired and/or wireless communication over a LAN 170. Although the server apparatus 150 is shown as a single element, the server apparatus 150 may be implemented with any number of computers, game platforms, or other computing devices. Each such computing device may have its own set of processors and memory, which enables installation of software from software media and supports execution of software instructions to perform various activities.

In an example, the LPS 154 is configured to track the location of the electronic headset 120 as the user 110 moves around within the physical space 102. The LPS 154 is thus configured to maintain a global perspective of the location of the electronic headset 120, which is independent of any SLAM or SSAL system. In a non-limiting example, the LPS 154 employs antennas (not shown) to detect Wi-Fi packets emitted by the electronic headset 120. The LPS 154 uses triangulation, trilateration, time-of-arrival, angle-of-arrival, mixed time-of-flight, and/or other techniques to identify the location of the packet source. Examples of suitable implementations of the LPS 154 may be found in copending U.S. application Ser. No. 15/452,451, filed Mar. 7, 2017 and in U.S. application Ser. No. 15/727,103, filed Oct. 6, 2017, both of which are incorporated herein by reference.

In example operation, the user 110 participates in a game or other application 152. The user 110 wears the electronic headset 120, which renders three-dimensional, holographic images, such as holograms 130*a* and 130*b*. As the user 110 moves, such that the electronic headset 120 moves and/or reorients, the SLAM system running in the electronic headset 120 updates the location and orientation of the electronic headset 120, such that the electronic headset 120 is able to render the holograms 130*a* and 130*b* in a stable and natural manner. For example, the electronic headset 120 renders the locations and shapes of the holograms in left and right display elements (not shown) of the electronic headset 120 such that the holograms appear to the user 110 as natural three-dimensional objects in the physical space 102. Note that the electronic headset 120 displays the hologram 130*b* so that it appears behind the wall 104*b*, which, in the case of AR, gives the user 110 the impression of having x-ray vision.

As the user 110 gets close to the wall 104*b*, the camera(s) in the electronic headset 120 may lose sight of the edges 106*a*-106*d*, causing the SLAM system to lose the geometrical referents that it requires to locate and orient the electronic headset 120. With no geometry to lock on to, the SLAM system loses tracking.

Rather than suspending operation of the game or application 152, however, and in accordance with improvements hereof, the electronic headset 120 instead switches from SLAM mode to SSAL mode, whereupon the electronic headset 120 resumes tracking based upon detection and tracking of the fingerprint formed by the pattern 140. Although the pattern 140 may have been in view of the camera(s) during SLAM mode, the SLAM system ignored the pattern 140 as it has no depth and lacks spatial geometry. In contrast, the SSAL system recognizes the pattern 140. As the electronic headset 120 moves and/or reorients, the pattern 140 changes position, size, and perspective as viewed by the camera(s), and the electronic headset 120 constructs its own location and orientation based on changes in the appearance of the pattern 140.

In some examples, the electronic headset 120 monitors its own position relative to walls or other flat surfaces, and begins searching for patterns on which the SSAL system may base fingerprints as the user 110 approaches a wall or other flat surface, even before the SLAM system loses tracking. In this manner, the electronic headset 120 can transition from SLAM mode to SSAL mode seamlessly and with no interruptions or discontinuities. For example, the electronic headset 120 continues to display holograms 130*a* and 130*b* in their proper apparent locations, both before and after the transition from SLAM mode to SSAL mode.

In some examples, the SLAM system generates a confidence level, which indicates a degree of certainty that the SLAM system is measuring location and orientation of the headset accurately. The electronic headset 120 may monitor the confidence level and compare it to a threshold. If the confidence level drops below the threshold, the electronic headset 120 may transition from SLAM mode to SSAL mode. In addition, the headset may begin searching for fingerprints as the confidence level falls to a value that approaches the threshold, even if the threshold is not crossed (and even if no approaching surface is detected), to facilitate a seamless transition from SLAM mode to SSAL mode if required. In other cases, when operating in SLAM mode, fingerprint detection is preferably disabled, to reduce computational burdens and to save power.

In some examples, upon switching from SLAM mode to SSAL mode, the electronic headset 120 employs, as a baseline for the SSAL system, last-known-accurate values of headset location and orientation as generated by the SLAM system, e.g., the values produced by the SLAM system just prior to the SLAM confidence level falling below the threshold. In this manner, initial values of location and orientation for use by the SSAL system are the last-good values produced by the SLAM system.

As the user 110 continues to move around in the space 102, the pattern 140 may eventually fall outside the view of the camera(s). Should this occur, the electronic headset 120 may search for a new pattern on which to base a new fingerprint and thereby remain in SSAL mode. Of course, if the SLAM confidence level rises above the threshold, the electronic headset 120 may switch back to SLAM mode. If SLAM confidence is below threshold and no new fingerprint can be found, then the headset may switch to another mode, referred to herein as LPS/IMU mode.

In LPS/IMU mode, the electronic headset 120 obtains its own location from the LPS 154 and obtains its own orientation from its internal IMUs. The electronic headset 120 may then fuse the LPS location and IMU orientation data with a previous known-good location and orientation (e.g., using Kalman filter techniques), to track location and orientation going forward. Preferably, the headset uses LPS/IMU mode for relatively short durations, as of IMU sensors have a tendency to drift.

In some examples, LPS/IMU mode is particularly useful for tracking quick head movements. For example, the headset may quickly switch from SSAL mode to LPS/IMU mode in response to a sudden user movement, when fingerprint tracking is momentarily lost. The electronic headset 120 may then switch back to SSAL mode when fingerprint detection is restored. One should appreciate that SSAL mode may provide its own confidence level, and that the transition from SSAL mode to LPS/IMU mode may be based on SSAL confidence falling below a SSAL threshold.

In some examples, the electronic headset 120 may switch directly from SLAM mode to LPS/IMU mode when SLAM confidence falls below the SLAM threshold. Such direct switching may occur, for example, when no fingerprint can be detected (e.g., low SSAL confidence) or when SSAL mode is otherwise unavailable or absent.

Figure 2:
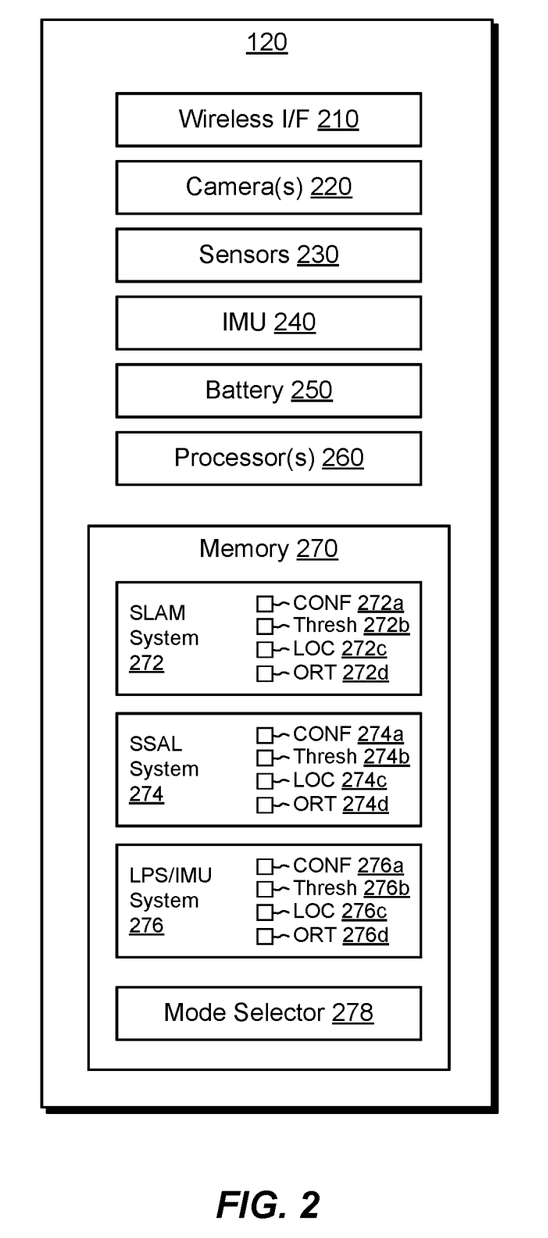
FIG. 2 is a block diagram of an example electronic headset as shown in FIG. 1.

FIG. 2 shows example constituents of the electronic headset 120 in additional detail. Here, the electronic headset 120 includes a wireless interface 210, such as a Wi-Fi interface, one or more cameras 220, one or more sensors 230, and the above-described IMU (inertial measurement unit) 240. The electronic headset 120 further includes a battery 250, a set of processors 260 (i.e., one or more processing chips or assemblies), and memory 270. The set of processors 260 and the memory 270 together form control circuitry, which is constructed and arranged to carry out various methods and functions as described herein. Also, the memory 270 includes a variety of software constructs realized in the form of executable instructions. When the executable instructions are run by the set of processors 260, the set of processors 260 carry out the operations of the software constructs. Although certain software constructs are specifically shown and described, it is understood that the memory 270 typically includes many other software constructs, which are not shown, such as an operating system, various applications, processes, and daemons. Further, one should appreciate that the constituents shown in FIG. 2 are intended to be illustrative rather than limiting.

As further shown in FIG. 2, the memory 270 "includes," i.e., realizes by execution of software instructions, the above-described SLAM system 272, SSAL system 274, and LPS/IMU system 276. The memory 270 also includes a mode selector 278, which is configured to select a current operating mode from among SLAM mode, SSAL mode, and LPS/IMU mode. In some examples, the set of cameras 220 are configured to acquire images in frames, with each frame representing a respective instant in time. If the electronic headset 120 uses multiple cameras, then each frame may include images from all of the cameras at a particular instant in time. In some examples, the mode selector 278 is configured to select a current mode on a per-frame basis. For example, the mode selector 278 may select SLAM mode for one frame and SSAL mode for the next frame, based, for example, on confidence levels.

In an example, the SLAM system 272 provides the following data elements:
Conf 272a: the current confidence level of the SLAM system 272.

Thresh 272b: a value of the confidence level used to distinguish accurate measurements of location and orientation by the SLAM system from inaccurate ones.
Loc 272c: the last location measurement made by the SLAM system 272, for which the confidence level 272a exceeded the threshold 272b.
ORT 272d: the last orientation measurement made by the SLAM system 272, for which the confidence level 272a exceeded the threshold 272b.

In a similar manner, the SSAL system 274 provides the following data elements:
Conf 274a: the current confidence level of the SSAL system 274.
Thresh 274b: a value of the confidence level used to distinguish accurate measurements of location and orientation by the SAAL system from inaccurate ones.
Loc 274c: the last location measurement made by the SSAL system 274, for which the confidence level 274a exceeded the threshold 274b.
ORT 274d: the last orientation measurement made by the SAAL system 274, for which the confidence level 274a exceeded the threshold 274b.

Likewise, the LPS/IMU system 276 provides the following data elements:
Conf 276a: the current confidence level of the LPS/IMU system 276.
Thresh 276b: a value of the confidence level used to distinguish accurate measurements of location and orientation by the LPS/IMU system from inaccurate ones.
Loc 276c: the last location measurement made by the LPS/IMU system 276, for which the confidence level 276a exceeded the threshold 276b.
ORT 276d: the last orientation measurement made by the LPS/IMU system 276, for which the confidence level 276a exceeded the threshold 276b.

In an example, the mode selector 278 makes reference to the above-described confidence levels (272a, 274a, and 276a) and thresholds (272b, 274b, and 276b) in selecting modes in which to operate the electronic headset 120, and uses location measurements (272c, 274c, and 276c) and orientation measurements (272d, 274d, and 276d) to manage transitions between modes.

Figure 3:
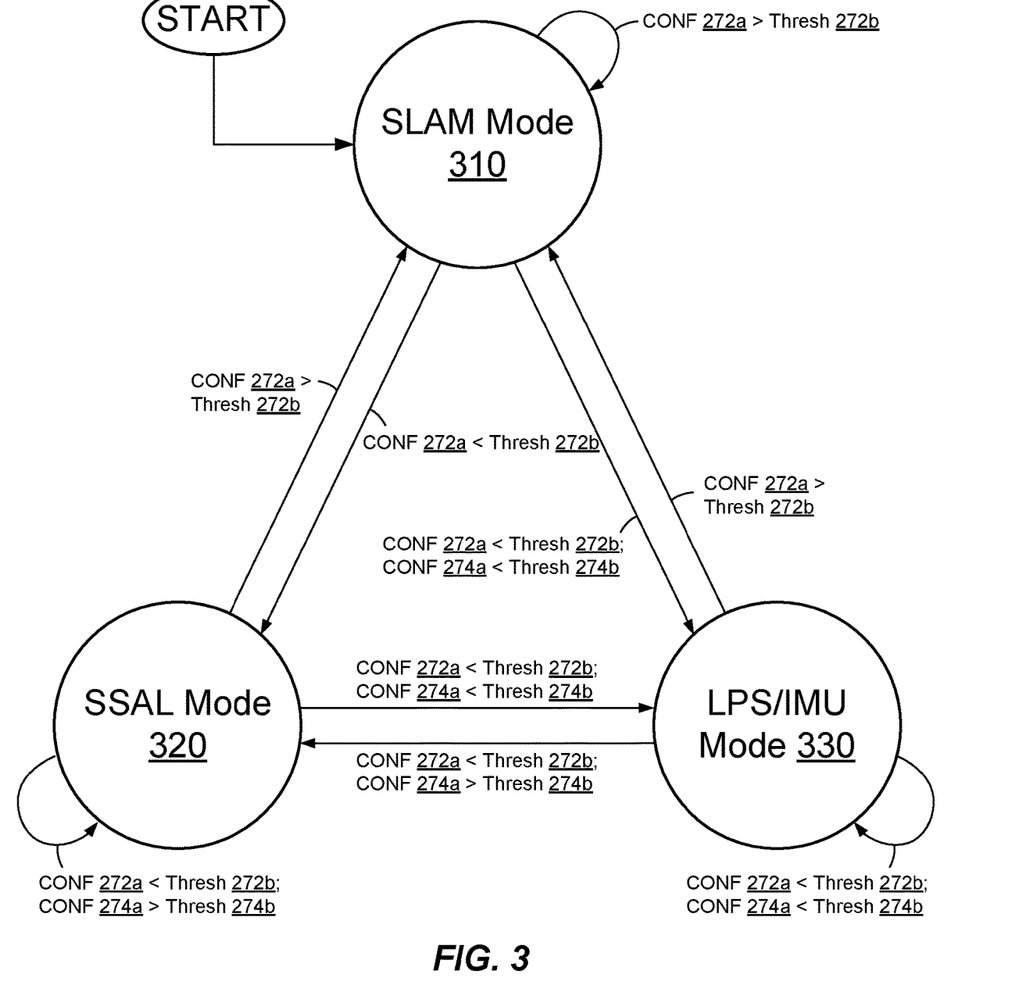
FIG. 3 is an example transition diagram that shows different modes in which the electronic headset of FIGS. 1 and 2 may operate.

FIG. 3 shows example transitions among SLAM mode 310, SSAL mode 320, and LPS/IMU mode 330. In an example, the depicted transitions are directed by the mode selector 278 of FIG. 2, which runs in the memory 270 of the electronic headset 120 under control of the set of processors 260.

As shown, the electronic headset 120 may start in SLAM mode 310 and remain in SLAM mode 310 as long as the SLAM confidence level 272a exceeds the SLAM threshold 272b. If SLAM confidence level 272a falls below SLAM threshold 272b, however, the electronic headset 120 transitions to SSAL mode 320, where it remains, as long as SLAM confidence level 272a remains below SLAM threshold 272b and SSAL confidence level 274a exceeds SSAL threshold 274b. If, while the electronic headset 120 operates in SSAL mode 320, SLAM confidence level 272a climbs above SLAM threshold 272b, the electronic headset 120 transitions back to SLAM mode 310.

If, while operating in SSAL mode 320, SSAL confidence level 274a falls below SSAL threshold 274b (and SLAM confidence 272a remains below threshold 272b), then the electronic headset 120 transitions to LPS/IMU mode 330, where it continues to operate as long as both SLAM and SSAL confidence levels remain below their respective thresholds. The electronic headset 120 may transition back to SSAL mode if SSAL confidence increases above threshold (e.g., if a fingerprint is detected), or it may transition back to SLAM mode 310 if SLAM confidence rises above threshold.

Thus, in an example, the electronic headset 120 operates in SLAM mode 310 as long as SLAM mode 310 remains accurate. The electronic headset 120 transitions to SSAL mode 320 if SLAM mode 310 becomes inaccurate, and transitions to LPS/IMU mode 330 if both SLAM mode 310 and SSAL mode 320 become inaccurate. The electronic headset 120 transitions back to SLAM mode 310 whenever SLAM confidence exceeds SLAM threshold, reflecting the fact that SLAM mode 310 is generally the most accurate mode. It is also expected to be computationally more efficient than SSAL mode 320.

In some examples, the electronic headset 120 maintains a timer for LPS/IMU mode 330, which limits the amount of time that the electronic headset 120 can normally remain in LPS/IMU mode 330. The timer may be sent to a predetermined interval, such as 50 milliseconds, 100 milliseconds, or some other value. If the timer counts down to zero before the electronic headset 120 transitions out of LPS/IMU mode 330, the electronic headset 120 may generate a warning or an error, indicating that tracking has been compromised.

One should appreciate that the arrangement of FIG. 3 does not preclude transitions directly from SLAM mode 310 to LPS/IMU mode 330. These may occur, for example, if both SLAM and SSAL confidence levels are below their respective thresholds, or is SSAL mode 320 is unavailable or absent.

Figure 4:
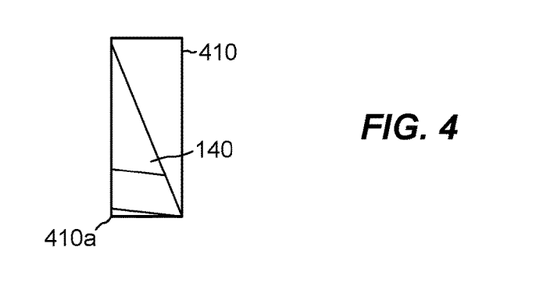
FIG. 4 is a front, plan view of an example fingerprint as shown in FIG. 1.

FIG. 4 shows a face-on view of the pattern 140 of FIG. 1, which forms the basis of a fingerprint for tracking in SSAL mode 320. When operating in SSAL mode 320, the electronic headset 120 may render the pattern 140 in a plane 410. The plane 410 coincides with a plane of the wall 102b or other surface on which the pattern 140 appears. The plane 410 may have an origin 410a, and the origin 410a may provide the origin of a wall coordinate system. Although not shown, the wall coordinate system has a third dimension, which extends into or out of the figure as depicted.

In some examples, the SSAL system 274 creates a signature from the pattern 140 as a set of extracted features. The extracted features uniquely define a plane and have an identifiable origin.

In an example, tracking in SSAL mode 320 employs transformations among different coordinate systems, such as the wall coordinate system, a device coordinate system, and a world coordinate system. In an example, the device coordinate system is formed by an optical axis of the camera(s) 220 in the electronic headset 120. For example, the device coordinate system has a Z-axis that extends directly forward, along the optical axis, and has X and Y axes extending directly to the right and directly up, respectively. The world coordinate system is independent of the wall and device coordinate systems and corresponds to a Cartesian coordinate system of the physical space 102. For example, X and Y axes of the world coordinate system correspond to horizontal dimensions (e.g., along the floor), while the Z axis may correspond to height. The origin of the world coordinate system may be anywhere in the physical space 102 or in any other location. In an example, the world coordinate system corresponds to Cartesian coordinates produced by the LPS 154.

Coordinate transformations are well-known in the art and may involve the use of matrices, vectors, quaternions, Euler angles, and/or other techniques, the particular aspects of which are not critical to the embodiments hereof. Points in one coordinate system correspond, one-to-one, with points in each of the other coordinate systems. Thus, for example, the same point expressed in the device coordinate system may also be expressed in the world coordinate system or in the wall coordinate system. Further, transformations between coordinate systems are reversible, meaning that one can go back and forth between coordinate systems at will.

Coordinate systems may be time variant, in that their origins and orientations may change over time. For example, the device coordinate system can change each time the camera(s) 220 acquire a new frame, as the electronic headset 120 moves and/or reorients. The wall coordinate system may also change, to reflect detections of fingerprints from different perspectives.

An example methodology for headset tracking in SSAL mode 320 will now be described in greater detail. This methodology depends on the following system capabilities:
1. Stereo Vision or MonoSLAM system has sufficient resolution to distinguish texture or other features on a randomly textured wall (or surface).
2. Machine Vision can identify the angle of the wall relative to the angle of the camera(s) 220.
3. Machine Vision can determine the distance to the wall from the camera(s) 220.
4. Machine Vision can identify a unique fingerprint within a first view of the camera(s) 220 and can find that fingerprint again within a second view at a different angle and distance when camera(s) 220 are pointed to the same fingerprinted area.
5. A technique that can use the coordinate system of the first view in capability 4 can transform that coordinate system to the second view.

Many systems are available that satisfy Capability 1 even at frame rates of 60 frames per second. Techniques for implementing Capabilities 2-5 are taught in standard computer/machine vision classes and can be learned from books such as "Learning OpenCV 3" by Adrian Kaehler and Gary Bradski (ISBN-13:978-1491937990). As such, techniques for implementing Capabilities 1-5 shall be taken as given and will receive no further attention.

For notation's sake, we shall borrow a term from the game engine Unity: transform. A "transform," T, is defined as a position (or location) in conjunction with an orientation. At the time the SLAM system 272 determines that it can no longer track the electronic headset 120, a final transform from the SLAM system 272 is known with a high degree of accuracy. We use this transform as an initial condition for the SSAL system 274, i.e. "$T_0$." In an example, the SSAL system 274 runs on a frame-by-frame basis (e.g., for every frame, a new position and orientation of the electronic headset 120 is located based on the old position and camera data. As we know the initial conditions, $T_0$, we can define a generalized approach to finding $T_{n+1}$ given $T_n$. This generalized approach applies when the fingerprint of Capability 4 in frame n of the camera(s) 220 is visible in frame n+1, thus invoking Capability 5. The generalized approach is set forth as follows.

We let $^{W}T_n^{D}$ be the transform of the device D (the electronic headset 120) in the world coordinate system $W$ at time n. This transform notation identifies the current coordinate system to the upper left of the transform symbol, T, identifies the object (wall or device) being described to the upper right, and identifies the frame or time step to the lower right.

Capabilities 2, 3 and 4 imply that there exists an operator $^{D_n}_W E_n$ that at time n identifies the transform of the wall, $^{D_n}T_n{}^W$, in the device coordinate system at time n. This can be expressed as $$^W T_n^D \otimes^{D_n}_W E_n = {}^{D_n}T_n{}^W \quad (EQ\ 1)$$

The exact form of the $\otimes^{D_n}_W E_n$ 0 operator depends upon the particular representation of the transform, i.e. matrix, vector, quaternion, Euler angles etc. This is merely a coordinate transformation; we use the $\otimes$ symbol to denote coordinate transformation.

Fact 1: We can translate any transform in three-dimensional space between the three coordinate systems $\mathbb{W}$, $D_n$, and $W_n$, for any time n. $\mathbb{W}$ is the world coordinate system and does not change with time n. $D_n$ is the device coordinate system at time (or frame) n. $W_n$ is the wall coordinate system at time n.

Assumptions 4 and 5 imply that there exists an operator that describes the transform of the wall at time n+1 in terms of the wall transform at time n. We call this operator $_{D_n}{}^{W_n}G_n$, where $$^{D_n}T_n W \otimes_{D_n}{}^{W_n}G_n = {}^{W_n}T_{n+1}{}^W. \quad (EQ\ 2)$$

We use a different symbol, $\otimes$, for this coordinate transformation to acknowledge that the actual mathematics might be different when transforming a coordinate system from one picture to another with the same content.

Using EQ 1 at time n+1, we get $$\mathbb{W}T_{n+1}^D \otimes^{D_{n+1}}_W E_{n+1} = {}^{D_{n+1}}T_{n+1}^W. \quad (EQ\ 3)$$

Give that the operator is clearly invertible, we can rewrite EQ 3 as $$\mathbb{W}T_{n+1}^D = {}^{D_{n+1}}T_{n+1}^W \otimes ({}^{D_{n+1}}_W E_{n+1})^{-1}. \quad (EQ\ 4)$$

Using Fact 1 from above, we can write $${}^{D_{n+1}}T_{n+1}^W = \mathbb{W}T_{n+1}^W \otimes {}^{D_{n+1}}_W C_{n+1}, \quad (EQ\ 5)$$

where $${}^{D_{n+1}}_W C_{n+1}$$

is the coordinate transformation from $\mathbb{W}$ to $D_{n+1}$. Plugging EQ 5 into EQ 4, we get $$\mathbb{W}T_{n+1}^D = (\mathbb{W}T_{n+1}^W \otimes {}^{D_{n+1}}_W C_{n+1}) \otimes ({}^{D_{n+1}}_W E_{n+1})^{-1}. \quad (EQ\ 6)$$

Now, if we plug EQ 1 into EQ 2 we get $$^W T_n^D \otimes {}^{D_n}_W E_n) \otimes_{D_n}{}^{W_n}G_n = {}^{W_n}T_{n+1}^W. \quad (EQ\ 7)$$

But we know from Fact 1 that $^W T_{n+1}^W$ can be written in the coordinate system of $W_n$:

$$^W T_{n+1}^W = {}^{W_n}T_{n+1}^W \otimes {}^W_{W_n} D_n, \quad (EQ\ 8)$$

where $^W_{W_n}D_n$ is the coordinate transformation from $W_n$ to $\mathbb{W}$. Now we plug EQ 7 into EQ 8 to get $$^W T_{n+1}^W = (({}^W T_n^D \otimes {}^{D_n}_W E_n) \otimes_{D_n}{}^{W_n}G_n) \otimes {}^W_{W_n}D_n. \quad (EQ\ 9)$$

We then plug EQ 9 into EQ 6 to yield the final result:

$$\mathbb{W}T_{n+1}^D = ((({}^W T_n^D \otimes {}^{D_n}_W E_n) \oplus_{D_n}{}^{W_n}G_n) \otimes {}^W_{W_n}D_n) \otimes {}^{D_{n+1}}_W C_{n+1}) \otimes ({}^{D_{n+1}}_W E_{n+1})^{-1}.$$

This final result shows that there is a straightforward relationship between the transform of the device at time n and time n+1, which enables the electronic headset 120 to generate its own transform (location and orientation) for a current frame based on the same transform from the previous frame and new camera data.

Figure 5:
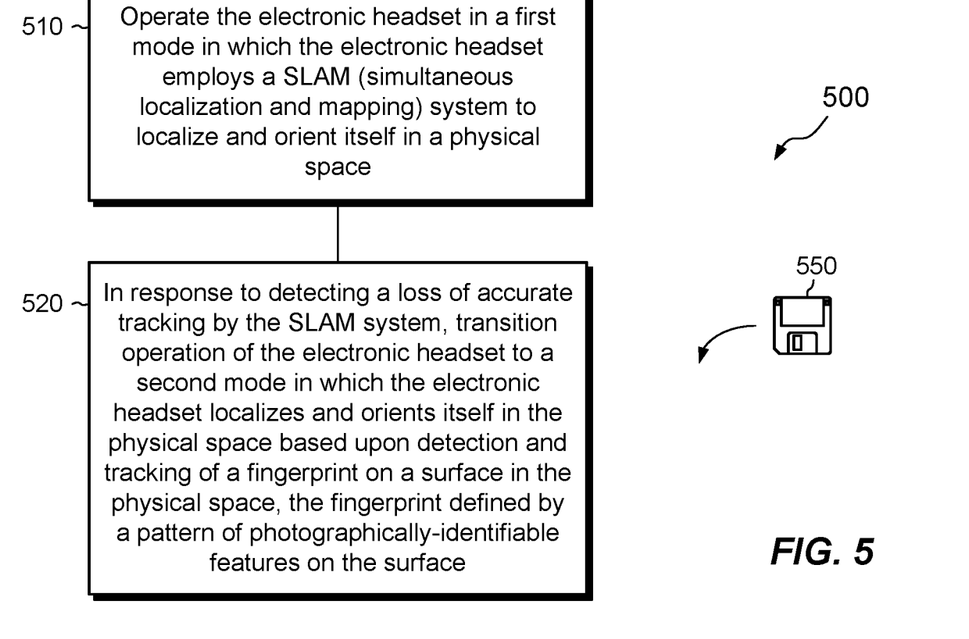
FIG. 5 is a flowchart showing one example method of localizing and orienting an electronic headset.
Figure 6:
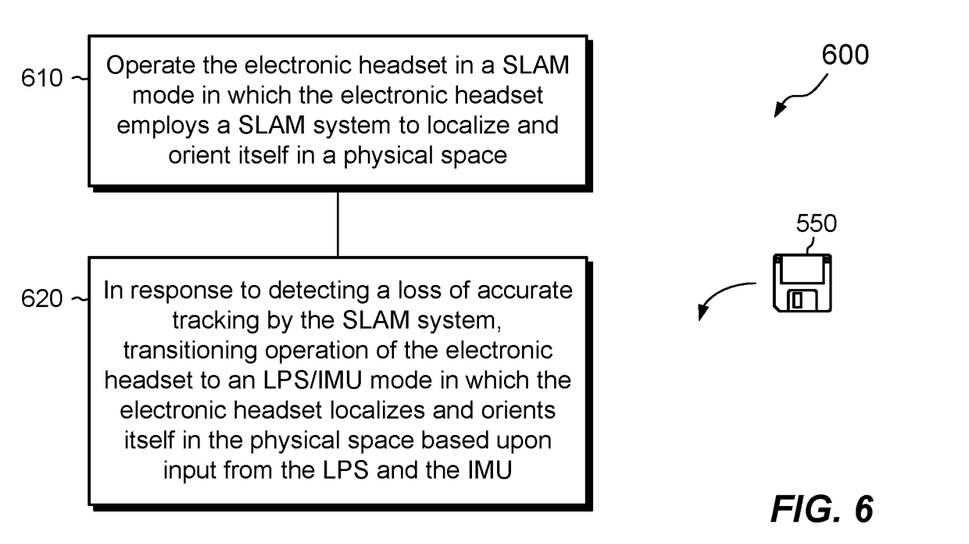
FIG. 6 is a flowchart showing another example method of localizing and orienting an electronic headset.

FIGS. 5 and 6 show example methods 500 and 600 that may be carried out in connection with the environment 100. The methods 500 and 600 are typically performed, for example, by the software constructs described in connection with FIG. 2, which reside in the memory 270 of the electronic headset 120 and are run by the set of processors 260. The various acts of methods 500 and 600 may be ordered in any suitable way. Accordingly, embodiments may be constructed in which acts are performed in orders different from those illustrated, which may include performing some acts simultaneously.

Method 500 starts at 510, where the electronic headset 120 is operated in a first mode 310 in which the electronic headset 120 employs a SLAM (simultaneous localization and mapping) system 272 to localize and orient itself in a physical space 102.

At 520, in response to detecting a loss of accurate tracking by the SLAM system 272, operation of the electronic headset 120 is transitioned to a second mode 320 in which the electronic headset 120 localizes and orients itself in the physical space 102 based upon detection and tracking of a fingerprint (e.g., based on pattern 140) on a surface (e.g., wall 104*b*) in the physical space 102. The fingerprint is defined by a pattern 140 of photographically-identifiable features on the surface.

Method 600 starts at 610, where the electronic headset 120 is operated in a first mode 310 in which the electronic headset 120 employs a SLAM system 272 to localize and orient itself in a physical space 102.

Method 600 then proceeds to 620, where, in response to detecting a loss of accurate tracking by the SLAM system 272, operation of the electronic headset 120 transitions to an LPS/IMU mode 330 in which the electronic headset 120 localizes and orients itself in the physical space 102 based upon input from the LPS 154 and the IMU 240.

An improved technique has been described for maintaining the ability of an electronic headset 120 to localize and orient itself in space, even upon a loss of SLAM tracking, by switching to an auxiliary tracking mode upon detection of a loss of accurate tracking by a SLAM system 272. In one example, the auxiliary tracking mode is based upon detection and tracking of a "fingerprint" on a flat surface imaged by one or more cameras 220 in the headset. In another example, the auxiliary tracking mode tracks location of the headset using an external LPS 154, which identifies headset location from a global perspective separate from the headset itself. This auxiliary tracking mode may also track orientation of the headset based upon output from an IMU 240 provided in the headset.

Having described certain embodiments, numerous alternative embodiments or variations can be made. For example, the electronic headset 120 may operate the different modes 310, 320, and 330 in any combination simultaneously, using one mode to verify and/or back up another. For example, while operating in SLAM mode 310, the electronic headset 120 may concurrently run instructions for LPS/IMU mode 330 and monitor the accuracy of LPS/IMU mode 330. In some examples, upon detecting drift in IMU 240, the electronic headset 120 may apply accurate SLAM location and orientation to recalibrate the IMU 240.

Also, the electronic headset 120 may feed location information from the LPS 154 directly into the SLAM system 272 and/or SSAL system 274, to provide such systems with an accurate, global perspective of the location of the electronic headset 120. Such information can inform the SLAM and SSAL systems of user location from the perspective of a larger space, such as multiple rooms, potentially expanding the capabilities of the electronic headset 120 beyond that which is possible when the perspective is limited to the immediate vicinity. For example, by knowing its own location from the global perspective, the electronic headset 120 gains the ability to visualize previously-mapped physical features of a space that are hidden behind walls or other barriers.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIGS. 5 and 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of localizing and orienting an electronic headset that renders three-dimensional, holographic images to a user, the method comprising:
    participating, by the electronic headset, in a game or other application;
    while participating in the game or other application, operating the electronic headset in a first mode in which the electronic headset employs a SLAM (simultaneous localization and mapping) system to localize and orient itself in a physical space; and
    in response to detecting a loss of accurate tracking by the SLAM system, transitioning operation of the electronic headset to a second mode in which the electronic headset localizes and orients itself in the physical space based upon detection and tracking of a fingerprint on a flat surface in the physical space, the fingerprint defined by a pattern of photographically-identifiable features on the surface and including an arbitrary arrangement of dots, color variations, splotches, marks, and/or stains, the electronic headset thereafter continuing to participate in the game or other application in the second mode,
    wherein the method further comprises, while the electronic headset operates in the first mode and prior to detecting the loss of accurate SLAM tracking, preparing to transition from the first mode to the second mode by identifying the fingerprint on the surface.

2. The method of claim 1, wherein transitioning operation of the electronic headset to the second mode is performed without interruption or discontinuity in the game or other application.

3. The method of claim 1, further comprising simultaneously operating the electronic headset in both the first mode and the second mode.

4. The method of claim 3, further comprising verifying one of the first mode or the second mode using the other of the first mode or the second mode.

5. The method of claim 1, further comprising, while the electronic headset operates in the first mode and prior to detecting the loss of accurate tracking, detecting that the electronic headset is approaching the surface, wherein preparing to transition from the first mode to the second mode by identifying the fingerprint on the surface is performed in response to detecting that the electronic headset is approaching the surface.

6. The method of claim 1, further comprising detecting the loss of accurate tracking by the SLAM system by (i) receiving, from the SLAM system, a confidence level that indicates a degree of certainty that the SLAM system is operating accurately and (ii) establishing the loss of accurate tracking in response to the confidence level falling below a predetermined threshold.

7. The method of claim 6, further comprising, in response to the confidence level rising from a value below the predetermined threshold to a value above the predetermined threshold, transitioning from the second mode to the first mode, thereafter suspending detection of fingerprints.

8. The method of claim 7, wherein the electronic headset includes a set of cameras configured to generate a succession of video frames, and wherein the method further comprises making a selection between the first mode and the second mode each time the set of cameras generates a new video frame.

9. The method of claim 1, wherein the electronic headset is disposed in operative communication with an external LPS (local positioning service) configured to measure real-time locations of the electronic headset in the physical space, wherein the electronic headset includes an IMU (inertial measurement unit) constructed and arranged to measure real-time orientation of the electronic headset, and wherein the method further comprises, in response to detecting a loss of accurate tracking based on fingerprint detection while operating in the second mode, transitioning operation of the electronic headset to a third mode in which the headset localizes and orients itself in the physical space based upon input from the LPS and the IMU.

10. The method of claim 9, further comprising transitioning operation of the electronic headset from the third mode to the second mode in response to restored detection of the fingerprint on the surface in the physical space.

11. The method of claim 9, further comprising transitioning operation of the electronic headset from the third mode to the first mode in response to detecting a restoration of accurate tracking by the SLAM system.

12. A computer program product including a set of non-transitory, computer-readable media having instructions which, when executed by control circuitry of an electronic headset, cause the control circuitry to perform a method for localizing and orienting the electronic headset, the method comprising:
   operating the electronic headset to participate in a game or other application;
   while participating in the game or other application, operating the electronic headset in a first mode in which the electronic headset employs a SLAM (simultaneous localization and mapping) system to localize and orient itself in a physical space; and
   while operating the electronic headset in a first mode, simultaneously operating the electronic headset in a second mode in which the headset localizes and orients itself in the physical space based upon detection and tracking of a fingerprint on a flat surface in the physical space, the fingerprint defined by a pattern of photographically-identifiable features on the surface and including an arbitrary arrangement of dots, color variations, splotches, marks, and/or stains already physically present on the surface, the electronic headset verifying one of the first mode or the second mode using the other of the first mode or the second mode,
   wherein the electronic headset is disposed in operative communication with an external LPS (local positioning service) configured to measure real-time locations of the electronic headset in the physical space, wherein the electronic headset includes an IMU (inertial measurement unit) constructed and arranged to measure real-time orientation of the electronic headset, and wherein the method further comprises, while simultaneously operating the electronic headset in both the first mode and the second mode, further simultaneously operating the electronic headset in a third mode in which the headset localizes and orients itself in the physical space based upon input from the LPS and the IMU.

13. The computer program product of claim 12, further comprising verifying one of the first mode, second mode, or third mode using at least one other of the first mode, second mode, or third mode.

14. The method of claim 1, wherein the fingerprint is detected as a pattern of color and/or texture that extends over at least a portion of the surface away from any edges that the surface forms with other surfaces or objects.

15. An electronic headset for rendering three-dimensional, holographic images to a user, the electronic headset including control circuitry constructed and arranged to:
   participate in a game or other application;
   while participating in the game or other application, operate the electronic headset in a first mode in which the electronic headset employs a SLAM (simultaneous localization and mapping) system to localize and orient itself in a physical space; and
   in response to detecting a loss of accurate tracking by the SLAM system, transition operation of the electronic headset to a second mode in which the electronic headset localizes and orients itself in the physical space based upon detection and tracking of a fingerprint on a flat surface in the physical space, the fingerprint defined by a pattern of photographically-identifiable features on the surface and including an arbitrary arrangement of dots, color variations, splotches, marks, and/or stains, the electronic headset thereafter continuing to participate in the game or other application in the second mode,
   wherein the control circuitry is further constructed and arranged to, while operating in the first mode and prior to detecting the loss of accurate tracking, (i) detect that the electronic headset is approaching the surface and (ii) in response to detecting that the electronic headset is approaching the surface, prepare to transition from the first mode to the second mode by identifying the fingerprint on the surface.

16. The electronic headset of claim 15, wherein the control circuitry constructed and arranged to transition operation of the electronic headset to the second mode is further constructed and arranged to transition operation without interruption or discontinuity in the game or other application.

17. The electronic headset of claim 15, wherein the control circuitry is further constructed and arranged to simultaneously operate in both the first mode and the second mode.

18. The electronic headset of claim 17, wherein the control circuitry is further constructed and arranged to verify one of the first mode or the second mode using the other of the first mode or the second mode.

* * * * *